United States Patent [19]
Kitterman

[11] 3,968,590
[45] July 13, 1976

[54] INSECT TRAP

[75] Inventor: Roger L. Kitterman, Tonopah, Ariz.

[73] Assignee: Wilbur-Ellis Company, San Francisco, Calif.

[22] Filed: Apr. 7, 1975

[21] Appl. No.: 565,429

[52] U.S. Cl. ............................. 43/114; 43/107
[51] Int. Cl.² ................................... A01M 1/14
[58] Field of Search .................. 43/114, 107, 108

[56] References Cited
UNITED STATES PATENTS

| 176,468 | 4/1876 | Grader | 43/108 |
|---|---|---|---|
| 1,194,736 | 8/1916 | Holden | 43/114 |
| 2,046,430 | 7/1936 | Rutherford | 43/107 |

FOREIGN PATENTS OR APPLICATIONS 19,812  8/1899  Switzerland........................... 43/108

Primary Examiner—Louis G. Mancene
Assistant Examiner—Daniel J. Leach
Attorney, Agent, or Firm—Drummond, Nelson & Ptak

[57] ABSTRACT

An insect trap including a cover assembly having a central projecting mounting hub and a disposable panel releasably engageable with the hub. The panel is coated with an appropriate trap substance which entangles the insects. Flexible mounting fingers are carried on the interior of the hub to frictionally secure the trap in an operative position on a stalk, branch, or other similar object.

5 Claims, 6 Drawing Figures

INSECT TRAP

The present invention relates to an insect trap and more particularly relates to a trap having a replaceable panel coated with a sticky substance which entangles insects lured onto the surface.

Control of insects in the home, garden and in commercial growing operations is often accomplished by treatment with an appropriate insecticide or pesticide. Pesticides and insecticides may be applied in the form of aerosol sprays, dust or as powders. Typically, commercially available insecticides contain lindane, malathion, or compounds of organic phosphorous. All of these compounds can be particularly irritating to humans and animals and, in some cases, can cause illness or even death in the instance of children or sensitive individuals. Accordingly, great care must be used in applying these chemicals to avoid contact with humans and animals. As a result of the inherent dangers involved in the use of insecticides and pesticides sprays and dusts, growers have turned to other means of insect control.

One method commonly used in the prior art is to utilize insect devices which trap the insects in a tacky or gummy substance. For example, the well known household fly paper rolls work in this way, trapping the insects when they come in contact with the gummy surface of the paper. Conventional fly paper rolls have only limited effectiveness, having primary application for household use. Additionally, since the tacky surface is exposed, aesthetic and sanitary objections to the use of this type of trap are common.

In order to overcome the objections to conventional fly paper, it has been suggested to enclose or house a member having a sticky surface so the insects are trapped within the interior of a device. In this way, the insects are less likely to escape and there is less possibility of contamination from such devices. Generally these devices include a box-like cover which has appropriate openings to admit the insects. A surface of the interior of the box-like structure is coated with an appropriate tacky substance which serves to trap the insects. All these types of devices provide advantages over conventional fly paper; they are nevertheless inconvenient in several respects. Generally the user must manually apply the trap substance to a surface of the interior of the trap. These traps are often bulky and inconvenient to place in locations to attract insects. Further, once it becomes necessary to replenish the trap, the sticky trap material must be removed and replaced in a manner requiring the user to come in contact with the trapped insects or the gummy surface.

From the foregoing, it will become apparent that there exists a need for an improved insect trap. The present invention provides an insect trap which is extremely convenient and versatile and is applicable to household, garden, field and orchard use. The device can be located by engaging it over an appropriately located stake or on a limb or branch of a tree or stalk of a sturdy plant. The trap surface of the device can be removed for disposal without the user having to come in contact with the gummy, insect contaminated surface. Replacement of a new trap surface is accomplished by simply "snapping" the panel in place. The device is widely applicable to almost any type of crop and can be successfully used to control or monitor almost any species of insects.

Briefly, the device of the present invention comprehends an insect trap including an enclosure having a cover member with a centrally located projecting mounting hub. Peripheral apertures are provided in the housing to permit entry of insects into the trap. A bottom panel is detachably supported on the mounting hub. The interior surface of the panel is coated with an appropriate sticky trap substance which serves to trap insects which enter into the enclosure. The mounting hub may also carry flexible fingers so that the device can be positioned about a stake, branch or limb. The panel can be easily disengaged from the mounting hub for disposal and replacement of a new panel.

The above and other objects and advantages of the present invention will become more apparent from a reading of the following specification, appended claims and drawings, in which:

Figure 1:
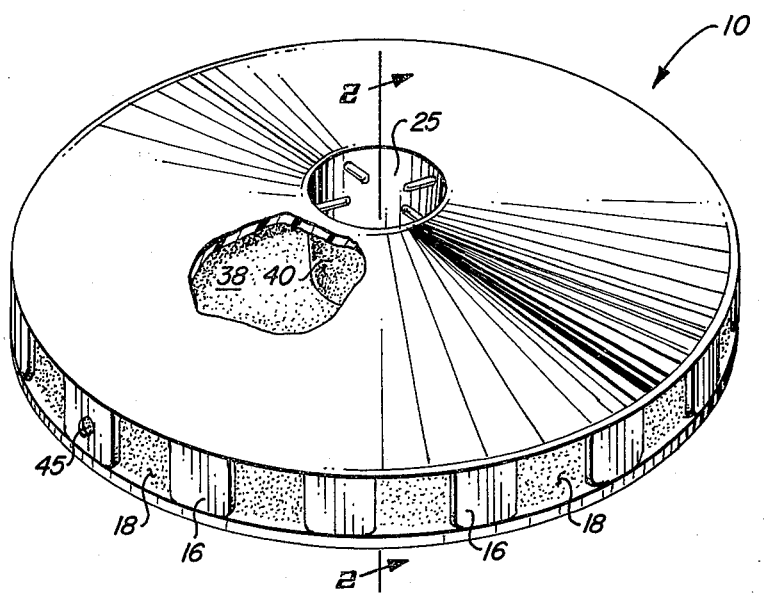
FIG. 1 is a top perspective view of the insect trap of the present invention.

Turning now to the drawings, the insect trap of the present invention is generally designated by the numeral 10. Insect trap 10 comprises a generally circular impervious cover assembly 15 which includes member 12 having a downwardly projecting hub 22 which defines a central, axial passageway 25. Preferably, hub 22 is formed as a truncated conical section having inner wall 14 converging downwardly as shown. Cover 12 may be flat or may be inclined as shown to provide drainage of moisture. A series of spaced apart tabs 16 project downwardly from periphery 17 of circular cover 12. The spaced apart tabs 16 define a plurality of annular spaces or openings 18. Aperture 45 is provided for attachment of a cord or wire. The cover 12, central hub 22 and peripheral tabs 16 are preferably formed as a unitary structure by appropriate molding process such as injection molding. The material of the enclosure may be any suitable plastic such as polyvinyl chloride. It may be desirable to construct the cover assembly from a bio-degradable material which, over a given period of time, will deteriorate in the event the device is left in a field after a season of use. It will be appreciated that while the trap is shown as being circular any convenient geometric shape can be utilized.

A plurality of flexible fingers 26 extend radially inwardly from wall 14 of hub 22 near the upper edge of passageway 25. A second set of fingers 27 project radially inward from near the bottom edge of opening 25. These fingers serve to frictionally engage stake, pole or branch so that the unit 10 can be placed in an operative position simply by slipping the hub about such an object.

Figure 2:
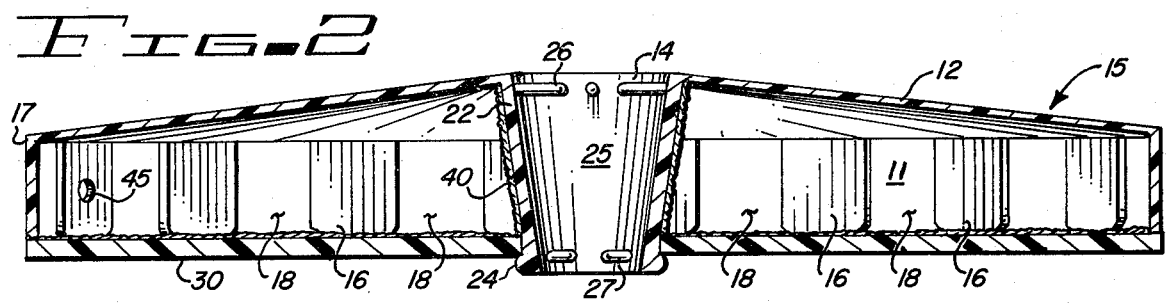
FIG. 2 is an enlarged cross-sectional view taken along lines 2—2 of FIG. 1.
Figure 3:
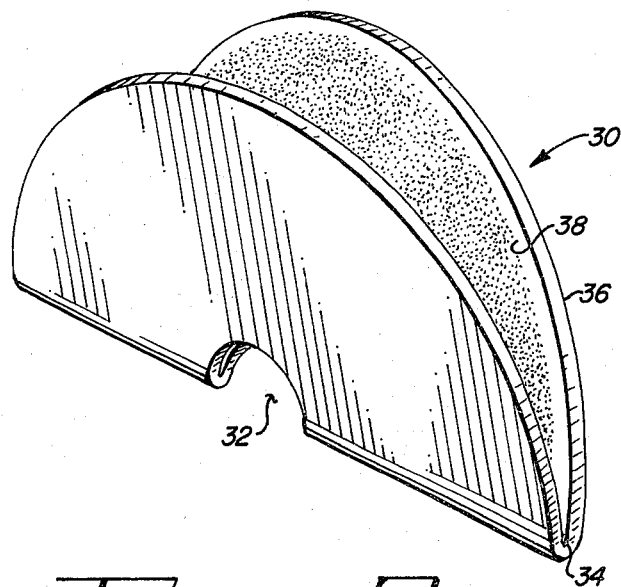
FIG. 3 is a perspective view showing the detachable trap panel in a partially folded condition.

The lower edge of hub 22 is provided with an exterior annular ridge or lip 24. Lip 24 serves to retain the lower trap panel 30 completing an enclosure. As best seen in FIGS. 2 and 3, panel 30 is circular having a diameter conforming to the diameter of cover 12. A concentric hole 32 is provided in panel 30 which is slightly smaller than the diameter of ridge 24 so the panel can be forced over ridge 24 on hub 22 and retained in this position with the cover engaging the lower edge of tabs 16. Panel 30 is preferably constructed of rigid paper or corrugated cardboard. The upper surface of panel 30 carries a coating 38 of a tacky or gummy insect entangling substance. A number of substances of this type for use in insect traps are commercially available. For example, the substance may be one of those sold under the trademarks "TANGLEFOOT" or "STICKUM." These substances contain no insecticides or toxic substances but operate to snare or entangle the unwary insect.

For convenience of storage and shipping, panel 30 is foldable in half along diametrical fold line 34. In the folded position, as seen in FIG. 3, the tacky surface applied on opposite halves of panel 30 are adjacent to one another. Surface 38 is not exposed to contact the user or to become contaminated in any way. The trap panel 30 can be conveniently stored in the folded position and unfolded into a flat planar position at the time of use. Another advantage residing in the foldable trap panel construction is that a used panel can be removed from the trap 10 and folded in half for sanitary handling and easy disposal.

The insect trap of the present invention will be better understood from the following description of use. Insect trap 10 of the present invention may be used for the control of monitoring of almost any species of insects in households, gardens and commercial growing operations. In commercial operations, the insect trap may be used in conjunction with field, row or orchard crops. As an insect control device, the spacing of the units is dependent upon the type of crop and insect to be controlled. For example, control of the pink boll worm in cotton fields can be successfully maintained by spacing the insect traps at regular intervals at one to four units per acre. Similarly, the unit is effective for controlling the boll weevil and is equally applicable to control of insects that affect orchard crops such as the codling moth. Similarly, the device can be used for control of insects for other commercial crops such as grapes where the red banded leaf roller is a particular problem. Nursery crops and tree farms can also utilize the device of the present invention.

Figure 4:
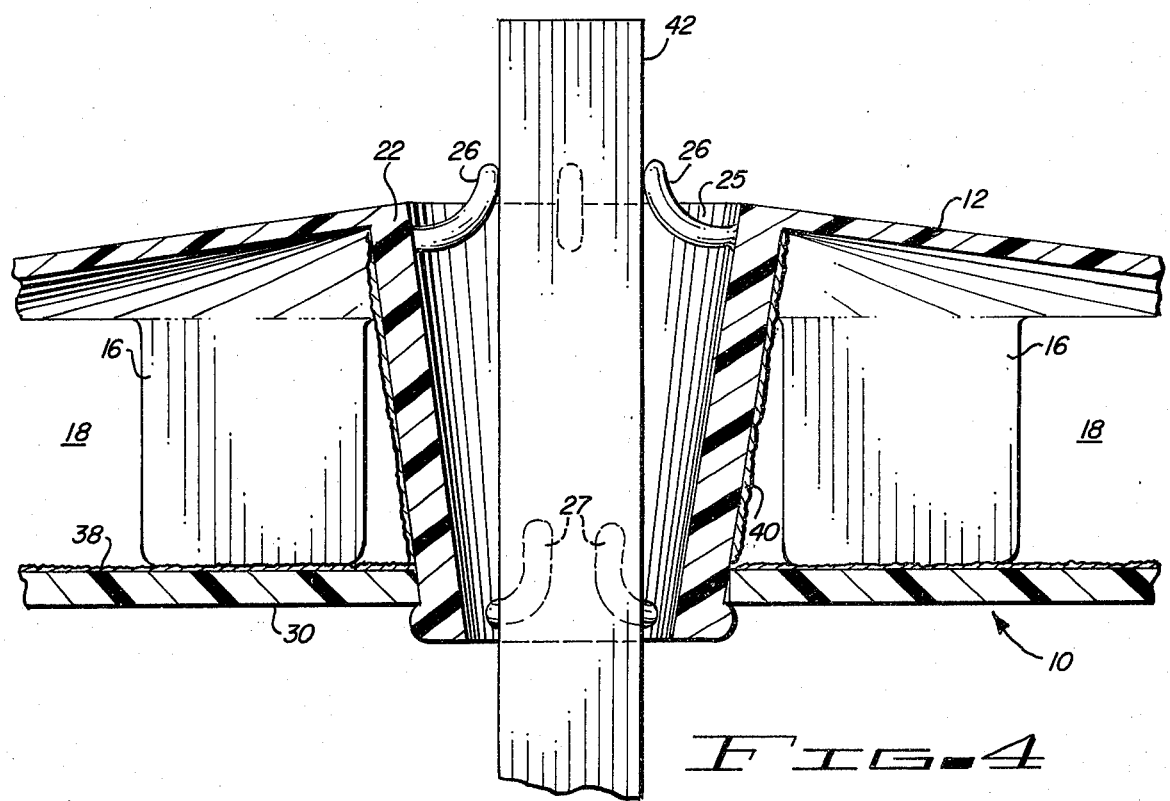
FIG. 4 is an enlarged partial cross-sectional view of the trap in an operative position on a stake.
Figure 5:
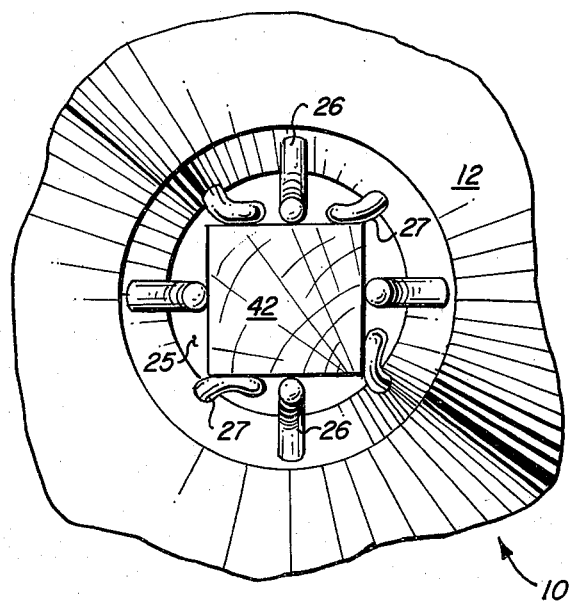
FIG. 5 is a partial plan view of the trap in an operative position on the stake.

If the growing crop is not rigid enough to support the weight of the device 10, a stake 42 can be driven in the ground at a preselected location as shown in FIG. 4. Insect trap 10 is then baited by applying a suitable lure chemical to the trap. Preferably the chemical will be one of a number of commercially available lures which are generally selective to certain species. Food can be used as a lure. However, the preferred lures are pheromones which are natural attractants and are commercially available and are sold under various tradenames such as "GOSSYPLURE," "VIRELURE" or "LOOP-LURE." Preferably the pheromones attractant is impregnated in a tape 40 which can be applied to hub 22 in the interior 11 of the trap. Once the trap is baited with the appropriate lure, panel 30 is removed from its storage location and unfolded into a flat position ready for use. Panel 30 is engaged on hub 22 of the trap by forcing or snapping the panel over annular ridge 24 at hole 32. As pointed out above, the interior or upper surface of panel 30 has been previously coated with a sticky substance 38 which entangles the insects lured into the trap. The assembled trap is then positioned on ground stake 42 by engaging lower and upper flexible fingers 26 and 27 about stake 42. The flexible fingers 26 and 27 deflect and frictionally engage stake 42 to secure the trap in an operative position. It will be obvious that the location and height of the trap can be easily changed in accordance with the requirements of the user.

The trap is left in place and the lure attractant 40 serves to entice flying and crawling insects into the interior 11 of the trap. The insects gain access to the trap through the various peripheral openings 18 in the trap. Once an insect enters the trap it comes in contact with the tacky coating 38 on the trap panel 30 and is caught.

The generally impervious cover 12 of the trap serves to protect the lure and tacky trap surface from the weather and to prevent escape of insects once they enter into the trap. If the trap panel were exposed, it would become ineffective in a very short period of time due to moisture and ultra violet degradation. When the grower wishes to insert a new panel 30, the old panel is disengaged by unsnapping it from annular ridge 24 and a replacement inserted in it. The removed panel can be refolded along fold line 34 with the gummy surfaces on each half of the panel in contact with one another. In this way the grower does not have to handle or come in contact with the insects which have become lodged in the gummy substance. The new panel is inserted in place and the trap is again ready for use.

Figure 6:
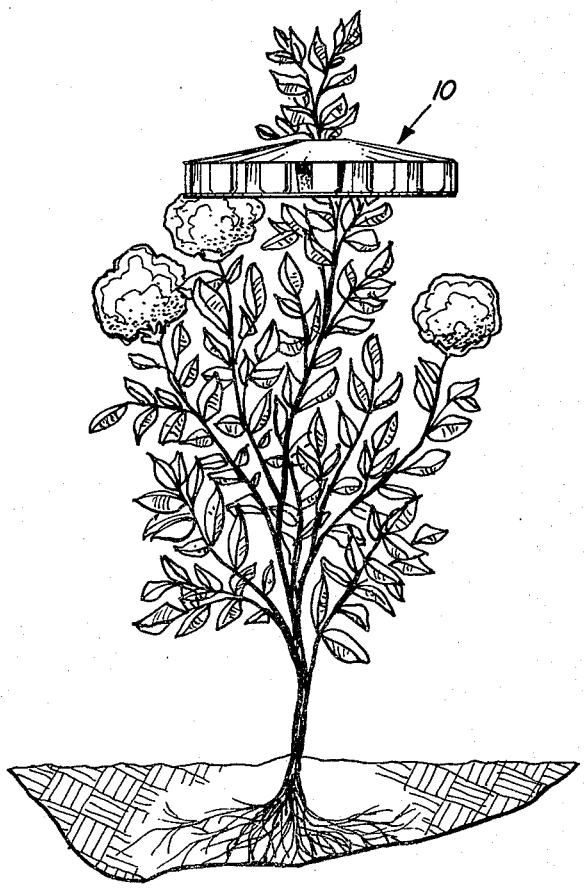
FIG. 6 shows the insect trap in position engaged on a stalk or limb of a growing plant.

If the crop is an orchard crop or a row crop in which the limbs or branch possess some rigidity, the trap 10 can be simply inserted over an available stalk, branch or limb as is shown in FIG. 6. In this way, the requirements of providing a mounting is eliminated. Also, it will be obvious to hang the device 10 in a suitable horizontal or vertical position. To hang the device 10 in a horizontal position, a wire hook can be inserted through opening 25 and engaged about the lower annular ridge of the hub. To support the device in a vertical position, a wire can be secured in hole 45 in one of the tabs 16. It is to be noted that the trap is effective in both positions although the former is preferred as the cover is less effective in the vertical position.

The insect trap of the present invention can also be used as a monitoring device in connection with other types of insect control such as spraying or dusting with insecticides or pesticides. For example, insect trap 10 can be baited and placed in a desired location in the field. At periodic intervals, the contents of the trap can be checked to determine the approximate density and constituency of the insect population in the field. Appropriate selective insecticides or pesticides can be then applied to eliminate the insects.

In the control of some insects, studies have shown that color may be a significant factor in attracting these insects. Accordingly, the device may be provided in various colors.

From the foregoing it will be seen that the present invention provides an insect trap which can be economically manufactured and which is suitable for use in a wide range of applications from household to commercial growing. The trap can be baited with various lures such as food or natural attractants such as the pheromones. The trap panel is easily foldable for convenience of storage and disposal and can be easily inserted and removed from the top. The enclosure protects the trap interior from weather and the elements. The trap itself can serve as a control method or can be used as a monitor for visual detection of insects in conjunction with other types of insect control methods. The trap can be easily and conveniently situated in the fields in an operative position and includes self-contained frictionally engaged means for this purpose.

It will be obvious to those skilled in the art to make various changes, alterations and modifications to the device described herein. To the extent that these changes, alterations and modifications to not depart from the spirit and scope of the appended claims, they are intended to be encompassed therein.

I claim:

1. A trap for control and monitoring of the insect population; said trap comprising:
   a. a detachable insect trap panel coated with a trap substance;
   b. a substantially impervious cover; and
   c. mounting means associated with said cover adapted to releasably engage said panel in a position spaced apart and subjacent said cover.

2. The trap of claim 1 wherein said trap panel defines an aperture and said mounting means comprises a generally cylindrical hub carrying an annular flange adapted to releasably engage said panel at said aperture.

3. The trap of claim 2 wherein said hub includes deflectable retaining means projecting inwardly from the hub interior adapted to frictionally secure said trap in an operative position about a stake, branch or similar object.

4. The insect trap of claim 3 wherein said cover is generally circular and said hub is centrally positioned therein and further including tab means projecting downwardly around the periphery of said cover defining openings therebetween for insect entry.

5. A trap panel for use in association with an insect trap having a cover including a projecting hub having mounting means thereon, said panel comprising:
   a. a flat sheet member having an insect retaining substance on one surface;
   b. said panel being foldable about a medial fold line for storage and disposal; and
   c. said sheet defining an aperture for engaging said sheet about said hub in a position of use.

* * * * *